Dec. 20, 1960 W. H. ROYER 2,965,049
TRAVELING TRAY CONVEYOR AND STABILIZING DEVICE
Filed April 4, 1956 3 Sheets-Sheet 1

INVENTOR.
Wayne H. Royer
BY
Otto Moeller
Attorney

Dec. 20, 1960 W. H. ROYER 2,965,049
TRAVELING TRAY CONVEYOR AND STABILIZING DEVICE
Filed April 4, 1956 3 Sheets-Sheet 2

INVENTOR.
Wayne H. Royer
BY
Attorney

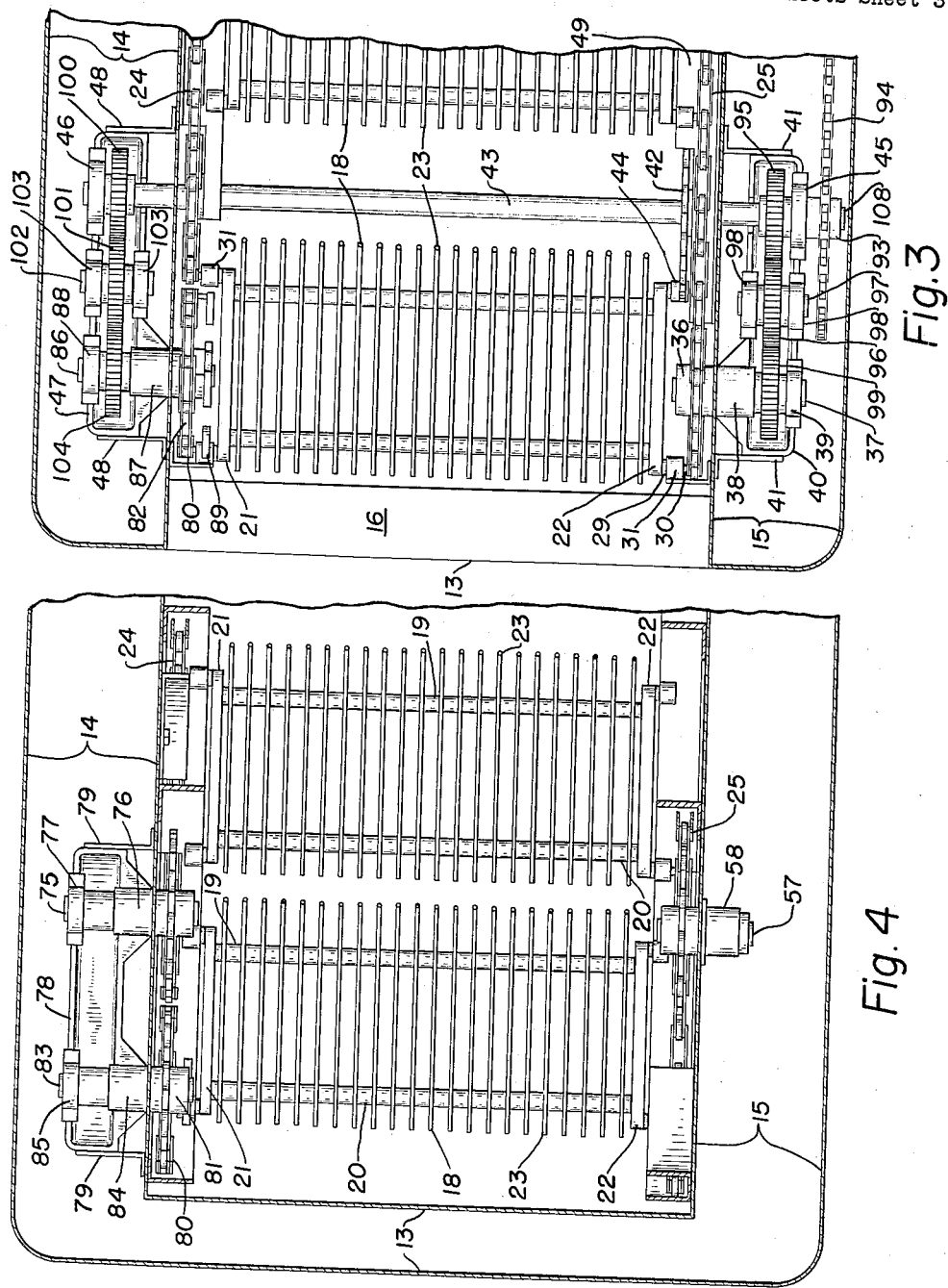

United States Patent Office 2,965,049
Patented Dec. 20, 1960

2,965,049
TRAVELING TRAY CONVEYOR AND STABILIZING DEVICE
Wayne H. Royer, York, Pa., assignor, by mesne assignments, to Capital Products Corporation, Mechanicsburg, Pa., a corporation of Pennsylvania
Filed Apr. 4, 1956, Ser. No. 576,110
3 Claims. (Cl. 107—57)

This invention relates to commercial baking ovens of the type wherein loading and unloading takes place at one end thereof, and more particularly to endless traveling tray conveyors therefor and stabilizing means for such trays whereby to maintain the pans of goods to be baked in horizontal position.

Such ovens customarily include endless chains adjacent opposite sides of the oven extending around arcuate guide elements or sprockets at each end of the oven to provide for the trays, connected between the opposed conveyor chains, a horizontal upper run and a horizontal lower run with arcuate connecting runs around the said guide elements or sprockets. Stabilizing means of one kind or another have been devised for maintaining the trays in a horizontal position as they pass around the arcuate guide elements or sprockets from one horizontal run to the other.

In one common oven arrangement, means are provided for momentarily tilting the trays on the lower horizontal conveyor run as they approach the turn at the forward end of the oven, whereby the pans of baked goods slide off the tray onto a transversely extending conveyor that transports the pans from the oven through one side thereof. Such tilting of the trays is objectionable, particularly in the case of pies or cakes having a soft filling, since the filling material has a tendency to flow resulting in an imperfect final product. In addition, the pans of baked goods are subject to severe shock as they slide off the tilted tray and strike the take away conveyor, so that particularly in the case of rolls, they are at times jarred out of the pans, and of course such shocks aggravate the flow of soft filling in pies and cakes. It is consequently an object of this invention to provide an oven and tray conveyor arrangement that obviates the necessity for tilting the trays during unloading of the pans of baked goods.

Another object is to provide a tray conveyor arrangement wherein loading and unloading of pans may be effected through the front end of the oven from vertically spaced loading and unloading stations, and wherein loading and unloading may be effected while maintaining the pans in horizontal position.

An important feature is the provision of a tray conveyor having a vertical run adjacent the front end of the oven, and an important object of the invention is to provide novel and effective stabilizing means for maintaining the trays in horizontal position as they travel along the vertical run and in a curving path from the vertical run to the upper horizontal run and in a curving path to the vertical run from the lower horizontal run.

In ovens of the type described above, wherein loading and unloading takes place at one end thereof, it is important that the upper and lower runs of the trays through the oven be spaced above the bottom of the oven for as much of their length as possible, in order to provide space beneath the said runs for heating elements so that heat may be applied to the products to be baked along both upper and lower runs of the trays. In the present invention, a vertical run is provided adjacent the front of the oven to provide sufficent space therealong for loading and unloading at vertically spaced points. At the front portion of the oven it is therefore necessary to bring a section of the lower horizontal or return run close to the bottom of the oven while the major rear portion of the return run is spaced above the bottom of the oven. A feature of the invention is the provision of a sloping run connecting the upper and lower horizontal sections of the tray conveyor run and stabilizing means for maintaining the trays in horizontal position as they travel along the sloping run.

The foregoing objects and features of the present invention, together with various other objects and features thereof which will become apparent, may be attained with the exemplary embodiment of the invention which is described in detail hereinafter and which is illustrated in the accompanying drawings.

Referring to the drawings:

Figure 3 is a sectional view taken on 3—3 of Figure 1;

Figure 4 is a sectional view taken on line 4—4 of Figure 1;

Figure 1:
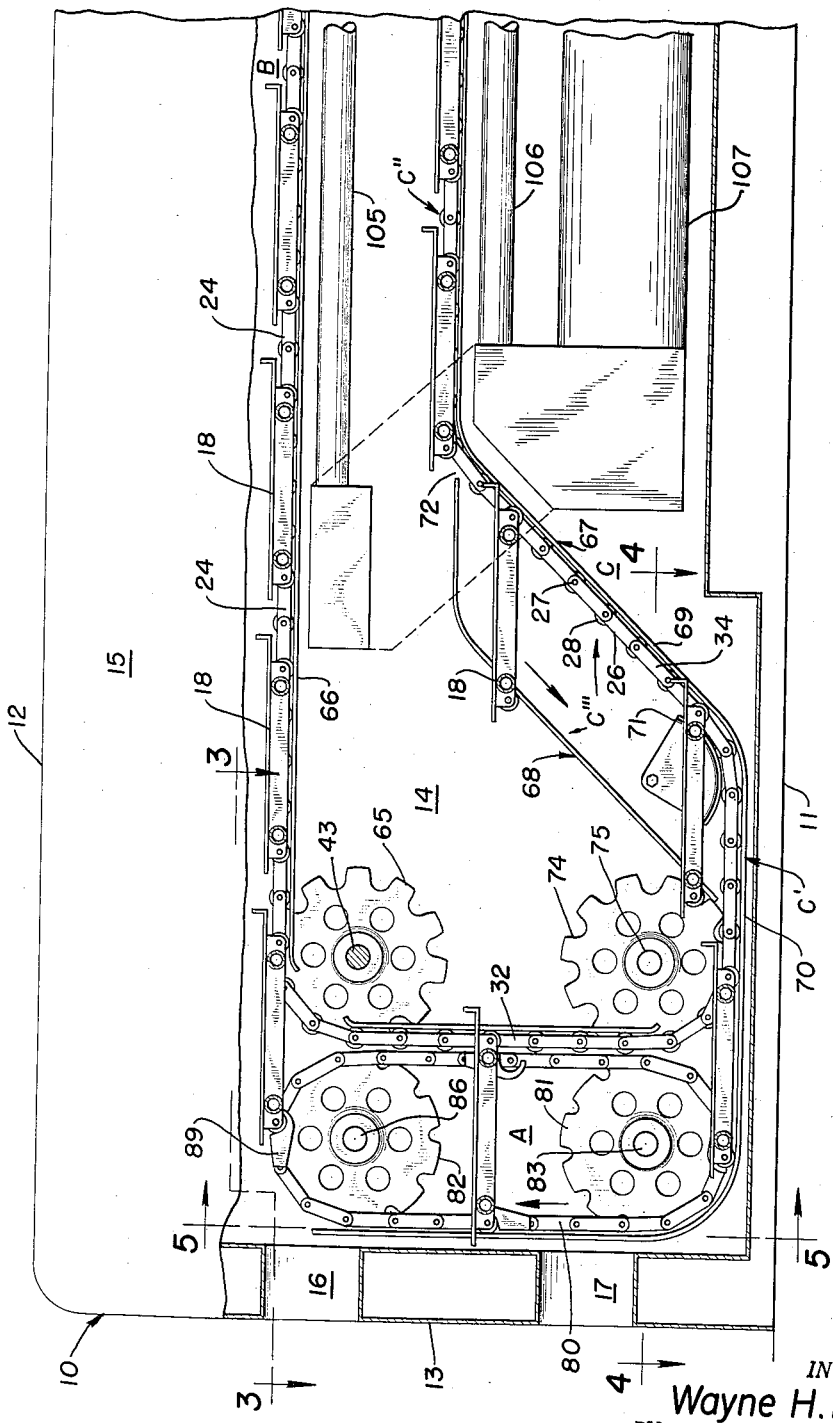
Figure 1 is a longitudinal vertical sectional view through the oven looking toward one side of the oven, with parts shown in elevation.

In the drawings, the numeral 10 designates a commercial type oven of generally rectangular configuration, only so much thereof being shown as is necessary to a complete understanding of the invention. The oven 10 includes a base or floor 11, a top wall 12, a front wall 13 and side walls 14 and 15. For convenience in locating the various elements of the invention, throughout this description the side wall 14 will be referred to as the far wall with that side of the oven adjacent thereto being referred to as the far side of the oven, and the side wall 15 will be referred to as the near wall with that side of the oven adjacent thereto being referred to as the near side of the oven. The walls of the oven, as is customary, are formed by inner and outer spaced sheets between which suitable insulating material may be interposed and which may also accommodate drive elements and other appurtenances.

The front wall 13 is provided with a pair of vertically spaced, horizontally elongated openings 16 and 17. Successive rows of pans of dough products to be baked are introduced through the upper or loading opening 16 onto successive trays 18 that are arranged to be transported in a closed loop through the oven by conveying means hereinafter described in detail. Successive rows of pans of baked dough products are removed from successive trays 18 through the lower or unloading opening 17.

The trays 18 are of generally rectangular shape, each comprising a frame including a pair of transversely extending, longitudinally spaced tubular frame members 19 and 20, and a pair of longitudinally extending side frame members 21 and 22 secured in suitable manner to and connecting the ends of the tubular members 19 and 20, and comprising a grid type pan supporting shelf made up of a plurality of longitudinally extending laterally spaced rods 23 secured in suitable manner to the tubular frame members 19 and 20.

The trays 18 are pivotally supported at two diagonally opposite corners by a pair of endless chains 24 and 25, by which chains the trays 18 are conveyed through the oven in an endless path. The chains 24 and 25 may be of any suitable construction, such as a standard roller-chain having a plurality of links 26 interconnected by pins 27 which carry rollers 28. As shown in the drawings, the near front corner of each tray 18 is pivotally secured to chain 25 and the far rear corner of each tray 18 is pivotally secured to chain 24. The means for pivotally securing the near front corner of a tray 18 to the chain 25 includes a hub-like member 29 rigidly secured to and extending laterally from the tray side frame member 22 adjacent the forward end thereof, and a pin 30 rigidly secured in the hub-like member 29 and extending laterally therefrom. The outer end of the pin 30 extends through a roller 28 of the chain 25, replacing the usual pin 27. An outboard tray roller 31 is preferably carried by the pin 30 between the chain 25 and the hub-like member 29, which is adapted to engage tracks, hereinafter referred to, to provide additional support for the tray 18. The far rear corner of each tray 18 is supported in similar manner by chain 24, and is provided with a similar tray roller 31. By the means above described, the trays 18 are connected with the chains 24 and 25 for movement therewith, and also for relative pivotal movement with respect thereto about the axes of the pins 30, so that the trays 18 may be maintained in horizontal position by means later described, as the chains 24 and 25 follow their various paths of movement through the oven. The chains 24 and 25 are arranged, as presently described, to move the trays 18 in the direction of the arrows in Figures 1 and 2, along a vertical tray conveyor run A adjacent the oven front wall 13, from the bottom of the oven past the unloading opening 17 and loading opening 16, then along a horizontal upper tray conveyor run B to the rear of the oven, and then along a return tray conveyor run C back to the lower end of vertical run A, completing the cycle. The return tray conveyor run C preferably includes a short horizontal run C' at the bottom of the oven adjacent the forward end thereof, a vertically and rearwardly offset horizontal run C" extending to the rear of the oven, and a sloping run C''' connecting the adjacent ends of runs C' and C".

Since, as previously stated, the near front corners of the trays 18 are pivotally attached to the chain 25 and the far rear corners of the trays 18 are pivotally attached to the chain 24, it is necessary to offset the vertical reach 32 of chain 24 rearwardly of the vertical reach 33 of chain 25 in order that the trays 18 may be maintained in horizontal position in traveling along vertical run A. Similarly, the sloping reach 34 of chain 24 must be offset rearwardly with respect to the sloping reach 35 of chain 25 in order that the trays 18 may be maintained in horizontal position in traveling along sloping run C'''.

At the junction of the vertical tray conveyor run A and the horizontal upper tray conveyor run B, the chain 25 to which the near front corners of the trays 18 are pivotally attached, is trained around a sprocket 36, the rollers 28 of the chain 25 engaging the indentations of the sprocket. The sprocket 36 is secured on the inner end of a stub shaft 37. The outer end of stub shaft 37 is rotatably supported in bearings 38, 39 carried by a gear housing 40 that is mounted by means of brackets 41 to the inner sheet of the oven near side wall 15, all as best shown in Figure 3.

Rearward of sprocket 36 is a similar sprocket 42 which is mounted on a transversely extending through shaft 43. The sprocket 42 is disposed between the chain 25 and the side frame members 22 of the trays 18, as shown in Figure 3, and the indentations of the sprocket 42 are arranged to be engaged by the outboard rollers 44 carried by the rear near corners of the trays 18. The far front corners of the trays 18 carry similar outboard tray rollers 44. Engagement of the roller 44 at the rear near corner of a tray 18 with the sprocket 42 prevents accidental rearward tilting of a tray 18 as it moves in an arcuate path from the vertical run A to the upper horizontal run B, since during travel of the tray through this arcuate path the front far corner of the tray is not fixed against upward displacement.

The through shaft 43 extends through the inner sheets of the oven side walls 14 and 15, the end projecting through the inner sheet of the near sidewall 15 being rotatably supported in a bearing 45 carried by the gear housing 40. The end of through shaft 43 projecting through the inner sheet of the far side wall 14 is rotatably supported in a bearing 46 carried by a gear housing 47 that is mounted by means of brackets 48 to the inner sheet of the oven far side wall 14.

A horizontal track 49 is secured in a suitable manner to the inner sheet of oven side wall 15, and extends longitudinally through the oven from a point adjacent the sprocket 36 to the rear portion of the oven. The track 49 is disposed subjacent the upper horizontal tray conveyor run B in position to engage and support the rollers 28 of chain 25. As best shown in Figure 3, the track 49 assumes a greater width adjacent the rear of sprocket 42 to provide a support, furthermore, for the outboard tray rollers 31 and 44 on the near side of the trays 18.

Along the horizontal section C" of the return run C of the tray conveyor, the chain rollers 28 of chain 25 and the outboard rollers 31 and 44 on the near side of the trays 18 engage and are supported on a horizontal upper rear track section 50 of the track 51, which track 51 is suitably secured to the inner sheet of the near oven wall 15.

Along the sloping section C''' of the return run C of the tray conveyor, there is provided a downwardly and forwardly sloping track section 52 of track 51, and a track 53, the latter having a horizontal section 54 forwardly offset with respect to track section 50, and a sloping track section 55 forwardly offset and parallel with respect to track section 52. The chain 25 is arranged to follow the track 53, with the chain rollers 28 engaging the track 53. Since, as previously stated, the near front corners of the trays 18 are pivotally attached to chain 25, it is apparent that the front portion of the trays 18 follow the track 53 with the near front tray roller 31 engaging the track 53. The near rear corner of each tray 18 being unattached to the chain conveyor 25, permits the near rear tray roller 44 to pass through the gap between track sections 50 and 54 and engage the sloping track section 52 providing a support for the near rear corner of each tray 18 as it descends along the sloping section C''' of the tray conveyor return run C. The sloping track sections 52 and 55 are offset a horizontal distance equal to the distance between the axes of the tray rollers 31 and 44 whereby to maintain the grid-like supporting shelf of the trays 18 in horizontal position as the trays 18 descend the sloping run C'''.

At the junction of the sloping tray conveyor run C''' and the short horizontal tray conveyor run C', the chain 25 is trained around a sprocket 56, the rollers 28 of the chain 25 engaging the indentations of the sprocket. The sprocket 56 is secured on a stub shaft 57 that is rotatably supported in a bearing 58 carried by the inner sheet of the oven near side wall 15.

Along the horizontal section C' of the return run C of the tray conveyor the rollers 28 of chain 25 and the outboard tray rollers 31 and 44 on the near side of the trays 18 engage and are supported on the horizontal lower front track section 59 of the track 51. At the junction of tray conveyor run C' and the vertical run A, the chain 25 follows an arcuate path adjacent the bottom of the front oven wall 13, it being constrained in this path by an arcuate section 60 of track 51 and a concentric arcuate section 61 of an inner track 62, both of which track sections 60 and 61 are engaged by the chain rollers 28 and the outboard rollers 31 of the trays 18. The vertical reach 33 of chain 25 is constrained between the vertical section 63 of track 51 and the vertical section 64 of track 62.

As previously stated, the vertical reach 32 of chain 24 is offset rearwardly with respect to vertical reach 33 of chain 25. At the upper end of the vertical reach 32, as best shown in Figure 1, the chain 24 is trained around a sprocket 65 which is mounted on the transversely extending through shaft 43 adjacent the inner sheet of oven far side wall 14. The rollers 28 of chain 24 engage the indentations of the sprocket 65.

As the chain 24 travels along the upper horizontal run B of the tray conveyor, the rollers 28 of chain 24 and the outboard rollers 31 and 44 on the far side of the trays 18 engage a horizontal track 66, suitably secured to the inner sheet of the oven far side wall 14.

Along the return run C of the tray conveyor there are secured to the inner sheet of oven far side wall 14, tracks 67 and 68, which are similar to the tracks 51 and 53 at the opposite side of the oven. The chain 24 follows the track 67, it being constrained in such path at the junction of the sloping track section 69 and the horizontal lower front track section 70 by an arcuate shoe 71 which is engaged by the rollers 28 of chain 24, the shoe 71 being secured in any suitable manner to the inner sheet of the oven far side wall 14.

Since, as previously pointed out, the far rear corners of the trays 18 are pivotally attached to the chain 24, it is apparent that the rear of the trays 18 will follow the sloping section 69 of track 67. A gap 72 between the rearward end of track 68 and the upper end of sloping track section 69 provides for passage therethrough of the chain 24 and the outboard rollers 31 at the far rear corners of the trays 18. The outboard rollers 44 at the far front corners of the trays 18 cross this gap 72 and engage the track 68. The forward ends of the trays 18 are restrained from following the track section 69, since as previously brought out the near front corners of the trays 18 are attached to the chain 25, which chain follows a track 53 on the near side of the oven corresponding to the track 68 on the far side of the oven.

Figures 2, 5, 6:
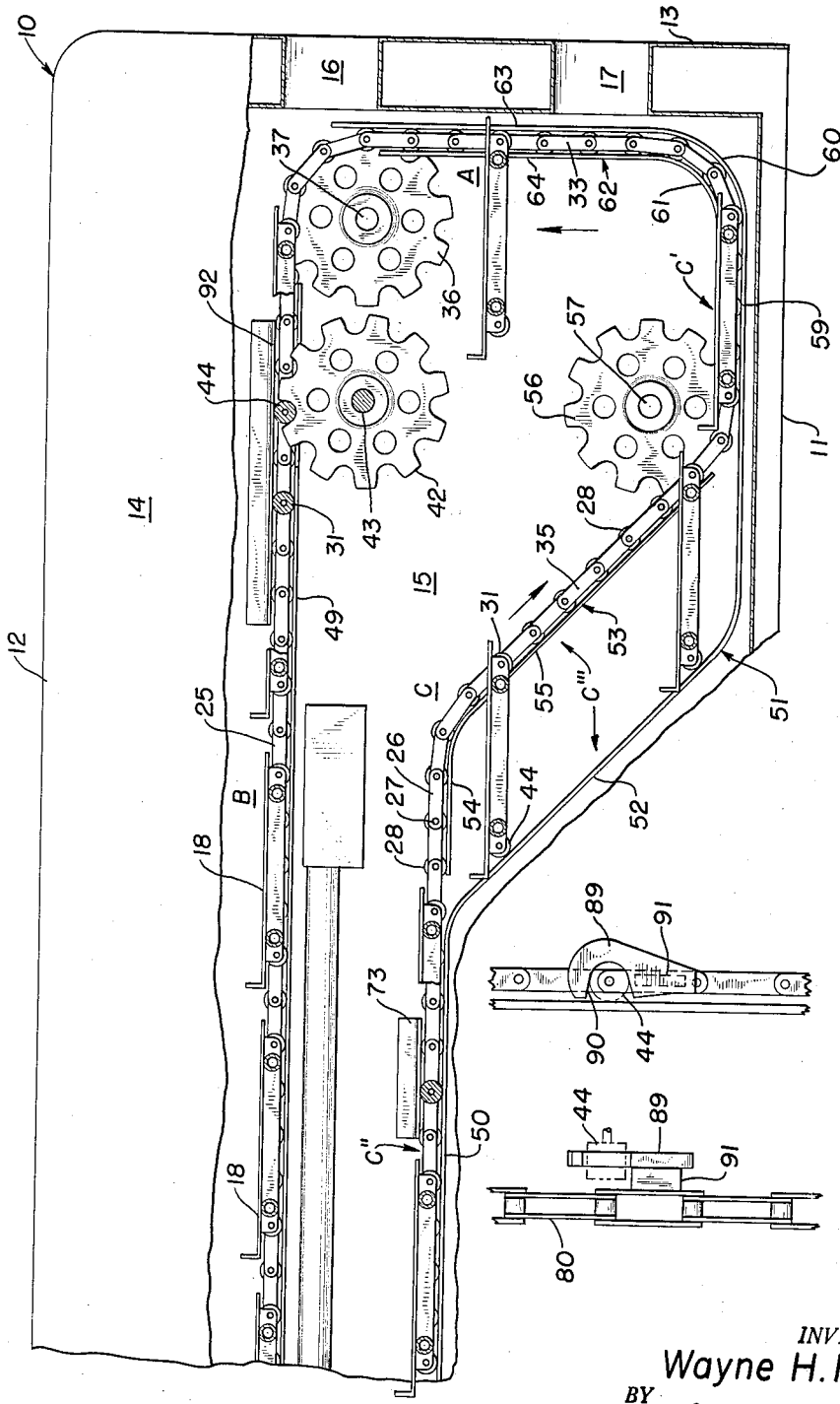
Figure 2 is a longitudinal vertical sectional view through the oven looking toward the side of the oven opposite that of Figure 1, parts again being shown in elevation.
Figure 5 is a fragmentary enlarged view of the vertical chain taken on line 5—5 of Figure 1.
Figure 6 is a side elevation of the chain shown in Figure 5.

Tilting of a tray 18, by reason of uneven loading or other causes, about its diagonal pivoted connections to chains 24 and 25, as the tray roller 44 at the far front corner of the tray traverses the gap 72 is prevented by a track section 73, Figure 2, which is disposed above track section 50 in position to engage the upper peripheral surface of the tray roller 44 at the near rearward corner of the tray.

Fom the foregoing description it will be apparent that the trays 18, as they are advanced to and travel along the sloping run C''', are fully stabilized and maintained in a horizontal position.

At the lower end of the vertical reach 32 of the chain 24, as best shown in Figures 1 and 4, the chain 24 is trained around a sprocket 74 which is secured on the inner end of a stub shaft 75, the stub shaft 75 being in axial alinement with the stub shaft 57 of sprocket 56 at the near side of the oven. The outer end of stub shaft 75 is rotatably supported in bearings 76, 77 carried by a bearing housing 78 that is mounted by means of brackets 79 to the inner sheet of the oven far side wall 14.

The trays 18, as they move along the lower horizontal return run C', are maintained in horizontal position, since at their near front and far rear corners they are pivotally attached to the chains 25 and 24, respectively, the rollers 28 of which engage and are supported by the track sections 59 and 70, respectively, and in addition the outboard tray rollers 31 at these corners likewise engage and are supported by the track sections 59 and 70; and since at their near rear and far front corners the tray rollers 44 engage and are supported by the track sections 59 and 70. Thus all four corners of the trays are positively supported.

As a tray 18 moves from the horizontal run C' to the vertical run A, its rearward end follows the rearwardly offset reach 32 of chain 24 since, as previously described, the far rear corner of the tray 18 is pivotally attached to the chain 24; while the forward end of the tray 18 follows the reach 33 of chain 25 since, as also previously described, the near front corner of the tray 18 is pivotally attached to the chain 25. In order to prevent downward or upward tilting of the trays about their diagonally opposite pivotally attached ends as the trays are moved along the vertical tray conveyor run A by the chains 24 and 25, auxiliary means is employed for maintaining the trays in stabilized and horizontal position.

The auxiliary stabilizing means includes a vertically extending endless chain 80 disposed between the vertical reach 32 of the chain 24 and the front wall 13 of the oven, the chains 80 and 24 being disposed in a common plane, as best shown in Figures 1, 3 and 4. The chain 80 is similar in construction to chains 24 and 25, previously described and is arranged to travel in the direction of the arrows on Figure 1. The lower end of the chain 80 is trained around a sprocket 81 disposed forward of and in tandem relation with respect to sprocket 74, while the upper end of chain 80 is trained around a sprocket 82 disposed forward of and in tandem relation with respect to sprocket 65.

Sprocket 81 is secured on the inner end of a stub shaft 83, the outer end of which is rotatably supported in bearings 84, 85 carried by the bearing housing 78. Sprocket 82 is secured on the inner end of a stub shaft 86, the outer end of which is rotatably supported in bearings 87, 88 carried by the gear housing 47.

Secured to the side of chain 80 facing inwardly of the oven are a plurality of equidistantly spaced hook members 89. The hook members 89 lie in a plane parallel to the side of the chain 80 and are spaced therefrom a distance such as to permit the indentation 90 of the hook members to engage the outboard tray roller 44 on the far front corner of a tray 18. As best shown in Figures 5 and 6 a lug or boss 91 disposed between and rigidly secured to a link of chain 80 and one end of hook member 89 provides for the spacing between chain 80 and the hook members 89. The lengths of the chains and the spacing of the trays 18 are so arranged that the distance between the indentations 90 of the equidistantly spaced hook members 89 is exactly equal to the distance between the far front tray rollers 44 of successive trays 18 so that a hook member 89 will always be in position to engage a far front tray roller 44 as a tray 18 approaches the sprocket 81. All the chains, 24, 25 and 80 are driven in timed relation, as will become apparent further on in this description of the invention.

As a tray 18 ascends vertical tray conveyor run A, the near front and far rear corners are held against upward or downward displacement relative to the chains 25 and 24 since, as previously described, the near front and far rear corners of the tray are pivotally attached to the chains 25 and 24, respectively. The near rear corner of the tray 18 is unattached and unsupported, as it ascends the vertical tray conveyor run A, but tilting of the tray 18 about its diagonally pivotally attached corners is prevented by the stabilizing chain 80. The hook member 89 engages the outboard tray roller 44 at the far front corner of the tray 18 along the ascending tray conveyor run A, and since the indentation 90 during such ascending run opens in a horizontal direction only, the top and bottom peripheral portions of the tray roller are in contact with the hook member. By reason of such engagement upward and downward tilting of the tray about its diagonal pivotally attached ends is prevented, and the tray is maintained in stabilized and horizontal position throughout the vertical tray conveyor run A.

Referring to Figure 1, it will be seen that when that portion of chain 80 carrying a hook member 89 arrives at the top peripheral portion of sprocket 82 and starts downwardly along the rear peripheral portion of sprocket 82, the far front tray roller 44 is no longer secured in the indentation 90 of the hook member 89 against upward and downward displacement relative to the chain 80, so that tilting of the tray 18 could occur if unevenly loaded. However, when the far front tray roller 44 reaches the aforesaid position, the near rear tray roller 44 is engaged along its top peripheral portion by a track section 92, shown in Figure 2, and along its bottom peripheral portion first by sprocket 42 and then by the portion of track 49 just to the rear of sprocket 42. Thus, along this portion of the path of a tray 18, support therefore is transferred from the far front corner of the tray to the near rear corner thereof.

Adverting now to the drive means for the various sprockets and chains, on an extension 108 of the through shaft 43 projecting from the gear housing 40 is secured a drive chain sprocket 93 connected by sprocket chain 94 to a driving motor (not shown), whereby through shaft 43 is rotated in clockwise direction as viewed in Figure 1. Sprocket 65 which is secured to shaft 43 is thus similarly rotated for operating chain 24 in the direction of the arrows in Figure 1. Rotation of shaft 43 also rotates the sprocket 42 which, as above explained, engages the near rear tray roller 44 to stabilize the trays 18 as they move from the vertical tray conveyor run A to the horizontal tray conveyor run B.

Secured on through shaft 43 within the gear housing 40 is a gear 95 in mesh with a similar gear 96 secured on a countershaft 97 which is rotatably mounted in bearings 98 carried by the gear housing 40, the gear 96 in turn meshing with a gear 99 secured on stub shaft 37 within the gear housing 40. Rotation of stub shaft 37, as previously described, effects rotation of sprocket 36 for operating chain 25 in the direction of the arrows in Figure 2.

Secured on through shaft 43 within the gear housing 47 is a gear 100 in mesh with a similar gear 101 secured on a countershaft 102 which is rotatably mounted in bearings 103 carried by the gear housing 47, the gear 101 in turn meshing with a gear 104 secured on stub shaft 86, as previously described, effects rotation of sprocket 82 for operating chain 80 in the direction of the arrows in Figure 1.

The mechanism shown and described provides for unloading and loading pans of bakery products on the trays 18 through the front of the oven and at vertically spaced points, and provides for stabilization or maintenance of the trays in a horizontal position throughout their cyclical travel through the oven. Being so stabilized, it is not necessary for the operator to exercise any precautions to balance the loads on the trays.

Mounted between upper horizontal tray conveyor run B and section C" of return run C, and also beneath the latter is suitable heat exchange means, including a plurality of longitudinally extending transversely spaced upper and lower tubes 105 and 106 leading from a suitable source of a heating medium and connected at their forward ends in suitable manner to a return flue 107.

I claim:

1. A stabilized tray conveyor for an oven having side walls and a front wall with said front wall being provided with an access opening comprising first and second endless chains disposed at opposite sides of said oven and each of said first and second endless chains being provided with upper and lower runs and a vertical run connected to said upper and lower runs, said vertical run of said second endless chain being disposed in close proximity to said front wall, and said vertical run of said first endless chain being spaced rearwardly from said oven front wall and rearward of the said vertical run of said second endless chain, a third endless chain having two vertical runs connected together and disposed between said oven front wall and said vertical run of said first chain, one of said vertical runs of said third chain being positioned in close proximity to said oven front wall and constituting a stabilizing run of said third chain, and the other said vertical run of said third endless chain being spaced rearwardly from said oven front wall and disposed in spaced parallel aligned relation with said vertical run of said first endless chain, a plurality of trays pivotally connected at diagonally disposed rear and front corners thereof with said first and second chains respectively, said trays being positioned in spaced relation to each other on said chains whereby the outer edges of said trays are maintained in close proximity to the access opening in the front wall of the oven while moving from the lower run of said first and second endless chains to the upper run of said first and second endless chains, means for driving said first, second and third endless chains in the same direction and at the same speed and thereby advancing said stabilizing run in close proximity to said oven front wall and in the same direction as the vertical runs of the first and second chains, and means on said third endless chain movable upwardly with said stabilizing run for supporting the unattached front corner of each tray for maintaining said trays in a horizontal plane as the trays are moved from the lower runs to the upper runs.

2. A stabilized tray conveyor for an oven having side walls and a front wall with said front wall being provided with an access opening, comprising first and second endless chains disposed at opposite sides of the oven, and each of said first and second endless chains being provided with upper and lower runs and a vertical run connected thereto and guided by upper and lower curved members, said members constraining the movements of said chains to paths at the ends of their vertical runs around turns of equal radii, said vertical run of said second endless chain being positioned contiguous to said front wall, and said vertical run of said first endless chain being spaced rearwardly of said oven front wall and rearward of the said vertical run of said second endless chain, a third endless chain having two vertical runs connected together and guided by upper and lower sprockets and disposed between said oven front wall and said vertical run of said first chain, one of said vertical runs of said third chain being positioned contiguous to said oven front wall and constituting a stabilizing run of said third chain, the other said vertical run of said third endless chain being spaced rearwardly from said oven front wall and disposed in spaced parallel aligned relation with said vertical run of said first endless chain, the center of curvature of said upper and lower members for said first chain and the axes of said upper and lower sprockets being respectively spaced apart a greater distance than their combined radii, a plurality of trays pivotally connected to said first and second endless chains and arranged in spaced relation to each other, said trays each pivotally attached at one rear corner to said first endless chain and pivotally attached at its diagonally opposite front corner to said second endless chain, means for driving said first, second and third endless chains in the same direction and same speed and thereby advancing said stabilizing run in close proximity to said oven front wall and in the same direction as the vertical runs of the first and second chains, and means on said third endless chain movable upwardly with said stabilizing run for supporting the unattached front corner of each tray and maintaining each tray in a horizontal plane as each tray is moved from the lower run of said first and second endless chains to the upper run of said first and second endless chains whereby the outer edge of each tray is moved past said access opening in close proximity to the front wall of said oven.

3. A stabilized tray conveyor for an oven as set forth in claim 1, wherein means on said third endless chain includes a rigidly mounted hook member supporting the unattached front corner of each tray.

References Cited in the file of this patent

UNITED STATES PATENTS

| 564,074 | Hitchner | July 14, 1896 |
| 1,669,060 | Livingston | May 8, 1928 |
| 2,397,726 | Cook | Apr. 2, 1946 |
| 2,534,692 | Aasted | Dec. 19, 1950 |
| 2,681,161 | Lorenz et al. | June 15, 1954 |

FOREIGN PATENTS

| 696,23 | Great Britain | Aug. 26, 1953 |